(12) United States Patent
Jolly et al.

(10) Patent No.: US 10,543,910 B2
(45) Date of Patent: Jan. 28, 2020

(54) HUB-BASED ACTIVE VIBRATION CONTROL SYSTEMS, DEVICES, AND METHODS WITH OFFSET IMBALANCED ROTORS

(71) Applicant: LORD Corporation, Cary, NC (US)

(72) Inventors: Mark R. Jolly, Raleigh, NC (US); Daniel Kakaley, Raleigh, NC (US); Gregory Fricke, Durham, NC (US)

(73) Assignee: LORD Corporation, Cary, NC (US)

( * ) Notice: Subject to any disclaimer, the term of this patent is extended or adjusted under 35 U.S.C. 154(b) by 743 days.

(21) Appl. No.: 15/111,617

(22) PCT Filed: Jan. 15, 2015

(86) PCT No.: PCT/US2015/011594
§ 371 (c)(1),
(2) Date: Jul. 14, 2016

(87) PCT Pub. No.: WO2015/109089
PCT Pub. Date: Jul. 23, 2015

(65) Prior Publication Data
US 2016/0325828 A1 Nov. 10, 2016

Related U.S. Application Data

(60) Provisional application No. 61/927,741, filed on Jan. 15, 2014.

(51) Int. Cl.
*B64C 27/00* (2006.01)
*F16F 15/22* (2006.01)

(52) U.S. Cl.
CPC .......... *B64C 27/001* (2013.01); *F16F 15/223* (2013.01); *B64C 2027/003* (2013.01)

(58) Field of Classification Search
CPC ............ B64C 27/001; B64C 2027/003; B64C 2027/005; B64C 17/02; F16F 15/223
See application file for complete search history.

(56) References Cited

U.S. PATENT DOCUMENTS

| | | | | |
|---|---|---|---|---|
| 2,225,929 A | * | 12/1940 | Sarazin | ............... B64C 11/008 416/18 |
| 4,045,948 A | * | 9/1977 | Hannibal | ............... D01H 7/048 384/230 |
| 4,241,615 A | * | 12/1980 | Ryan | ...................... B06B 1/167 172/40 |
| 5,639,214 A | * | 6/1997 | Guimbal | ............... B64C 27/001 416/145 |
| 5,833,567 A | * | 11/1998 | Fernandez | ............ F16H 33/185 475/255 |

(Continued)

*Primary Examiner* — Carlos A Rivera
*Assistant Examiner* — Wayne A Lambert (57) ABSTRACT

Systems, devices, and methods for a hub-based active vibration control (AVC) design includes at least one pair of co-rotating motorized imbalanced rotors that create a controllable rotating force vector that can be controlled to cancel hub loads on a rotating hub. This control is achievable using a configuration in which each rotor has an axis of rotation that is offset from the hub axis of rotation. In this way, in a loss of operation failure mode, the system is designed such that centrifugal forces will cause the masses to spin to an orientation of low static imbalance.

17 Claims, 10 Drawing Sheets (56) References Cited

U.S. PATENT DOCUMENTS

| | | | | |
|---|---|---|---|---|
| 6,045,090 A * | 4/2000 | Krysinsky | ............ | B64C 27/001 188/378 |
| 7,722,322 B2 * | 5/2010 | Altieri | .................... | G01M 1/22 415/119 |
| 8,403,643 B2 * | 3/2013 | Welsh | .................. | B64C 27/001 416/145 |
| 8,435,002 B2 * | 5/2013 | Jolly | .................... | B64C 27/001 415/1 |
| 8,579,589 B2 * | 11/2013 | Manfredotti | ......... | B64C 27/001 416/145 |
| 8,920,125 B2 * | 12/2014 | Welsh | .................. | B64C 27/001 310/81 |
| 10,099,780 B2 * | 10/2018 | Welch | .................. | B64C 27/001 |
| 2002/0123403 A1 | 9/2002 | Welsh | | |
| 2005/0075210 A1 * | 4/2005 | Frederickson | ............ | B06B 1/16 475/346 |
| 2005/0079056 A1 * | 4/2005 | Welsh | .................. | B64C 27/001 416/145 |
| 2006/0083617 A1 * | 4/2006 | Jolly | .................... | B64C 27/001 416/133 |
| 2010/0034655 A1 | 2/2010 | Jolly et al. | | |
| 2010/0209242 A1 * | 8/2010 | Popelka | ................ | B64C 27/001 416/1 |
| 2011/0155841 A1 * | 6/2011 | Cranga | ................ | B64C 27/001 244/17.11 |
| 2011/0194934 A1 | 8/2011 | Popelka et al. | | |
| 2015/0203196 A1 * | 7/2015 | Heverly, II | ........... | B64C 27/001 701/3 |
| 2016/0195161 A1 * | 7/2016 | Hunter | ................. | B64C 27/001 74/570.1 |

\* cited by examiner

HUB-BASED ACTIVE VIBRATION CONTROL SYSTEMS, DEVICES, AND METHODS WITH OFFSET IMBALANCED ROTORS

CROSS-REFERENCE TO RELATED APPLICATIONS

The present application claims the benefit of U.S. Provisional Patent Application Ser. No. 61/927,741, filed Jan. 15, 2014, the disclosure of which is incorporated herein by reference in its entirety.

FIELD OF INVENTION

This relates to the field of vibration and noise control for any system with an unwanted vibratory disturbance.

BACKGROUND

Multiple helicopter original equipment manufacturers (OEMs) are interested in hub-based active vibration control (AVC). Placing force generators on the helicopter hub provides the capability of canceling hub loads near the source, thus enabling global vibration control.

One type of hub-based force generator comprises two co-rotating motorized imbalanced rotors. These rotors may rotate in the same direction as the hub such that the masses are rotating at the blade pass frequency. These rotors create a controllable rotating force vector that can be controlled to cancel hub loads. Another type of hub-based force generator comprises two pairs of co-rotating motorized imbalanced rotors—one pair rotating in the same direction as the hub, and the other pair rotating in the opposite direction.

One challenge with hub-based AVC, however, pertains to the need to address certain failure modes such as loss of operation or loss of power in which the imbalanced rotors will discontinue rotating relative to the hub. They may come to a stop in a statically balanced condition, in a statically worst case imbalance condition, or in some condition in between. The static imbalance that results after loss of operation will create 1P hub loads that will cause vibration on the hub, the gearbox and the engines. The static imbalance condition that results after such a failure mode may dictate the severity of the failure mode (e.g., minor, major, hazardous, or catastrophic). For example, if after loss of operation, the rotors come to rest in a statically mass balanced condition, this may be classified as a Minor failure mode. On other hand, if after loss of operation, the rotors come to rest in a severely imbalanced condition, the resulting 1P loads and vibration may be severe enough that this may be classified as a Hazardous or catastrophic failure mode. If the latter is true, a hub-based AVC system design is required that will sufficiently mitigate this failure mode. Accordingly, there is a need for improvements to design and system architecture to address potentially hazardous and catastrophic failure modes.

SUMMARY OF THE INVENTION

A hub based AVC design has been conceived that includes at least one pair of co-rotating motorized imbalanced rotors that create a controllable rotating force vector that can be controlled to cancel hub loads on a rotating hub. This control is achievable using a configuration in which each rotor has an axis of rotation that is offset from the hub axis of rotation. In this way, in a loss of operation failure mode, the system is designed such that centrifugal forces will cause the masses to spin to an orientation of low static imbalance.

In one aspect the hub-based AVC system comprises a hub associated with a rotary wing aircraft, at least one controller, at least one sensor, and at least one pair of imbalanced rotors. The hub configured for rotation about a hub axis of rotation at a hub frequency. The at least one sensor in electronic communication with the at least one controller, the at least one sensor configured to measure at least one vibration associated with the rotary wing aircraft. The at least one pair of imbalanced rotors coupled with the rotating hub, the at least one pair of imbalanced rotors comprising: a first imbalanced rotor having a first axis of rotation that is offset in a first direction from the hub axis of rotation; and a second imbalanced rotor having a second axis of rotation that is offset from the hub axis of rotation in a second direction that is different from the first direction. Wherein the at least one controller is configured to provide control to at least one of the imbalanced rotors. Wherein the at least one pair of imbalanced rotors is configured for co-rotation at a controllable rotor speed. Wherein a phase associated with each imbalanced rotor is adjustable to create a controllable rotating force vector In another aspect, a method for active vibration control at a rotating hub of a rotary wing aircraft is provided. The hub configured for rotation about a hub axis of rotation at a hub frequency. The method comprises: providing at least one controller and at least one sensor capable of measuring a vibration in the rotary wing aircraft, wherein the at least one sensor is in electronic communication with the at least one controller; providing at least one pair of imbalanced rotors coupled with the hub, the at least one controller controlling the at least one of imbalanced rotors; during normal operation, co-rotating at least one pair of imbalanced rotors that are coupled with the hub at a controllable rotor speed, wherein a phase associated with each imbalanced rotor is adjustable to create a controllable rotating force vector; and during a loss of operation or loss of power failure mode, rotating the at least one pair of imbalanced rotors to an orientation of low static imbalance with respect to one another.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

Referring to FIGS. 1-11, the following provides for hub-based active vibration control systems, devices, and methods with offset imbalanced rotors. In representative embodiments shown in FIGS. 1 and 2, for example, an active vibration control (AVC) system, generally designated 100, is mounted about a hub 101 that is associated with a rotary wing aircraft, the hub 101 being configured for rotation about a hub axis of rotation 102 at one or more selected hub frequency. In addition, although not shown in the figures, those having skill in the art will appreciate that other elements of a hub-based AVC system may likewise be provided about the hub 101, including but not limited to a housing and/or wiring and control electronics (not shown). The controller, programming and associated electronics are known to those having skill in the relevant art.

The control electronics include at least one controller (not shown) and at least one sensor (not shown). The at least one sensor is in electronic communication with the at least one controller, the at least one sensor configured to measure at least one vibration associated with the rotary wing aircraft. In one embodiment, the at least one controller is configured to provide control to at least one of the imbalanced rotors. In one embodiment, each imbalanced rotor has at least one controller providing control thereto. In another embodiment, each pair of imbalances rotors has at least one controller providing control thereto. In another embodiment, the at least one controller is configured to provide control to at least one pair of the imbalanced rotors. In one embodiment, the at least one controller is configured to adjust a magnitude of the controllable rotating force vector.

Figure 1:
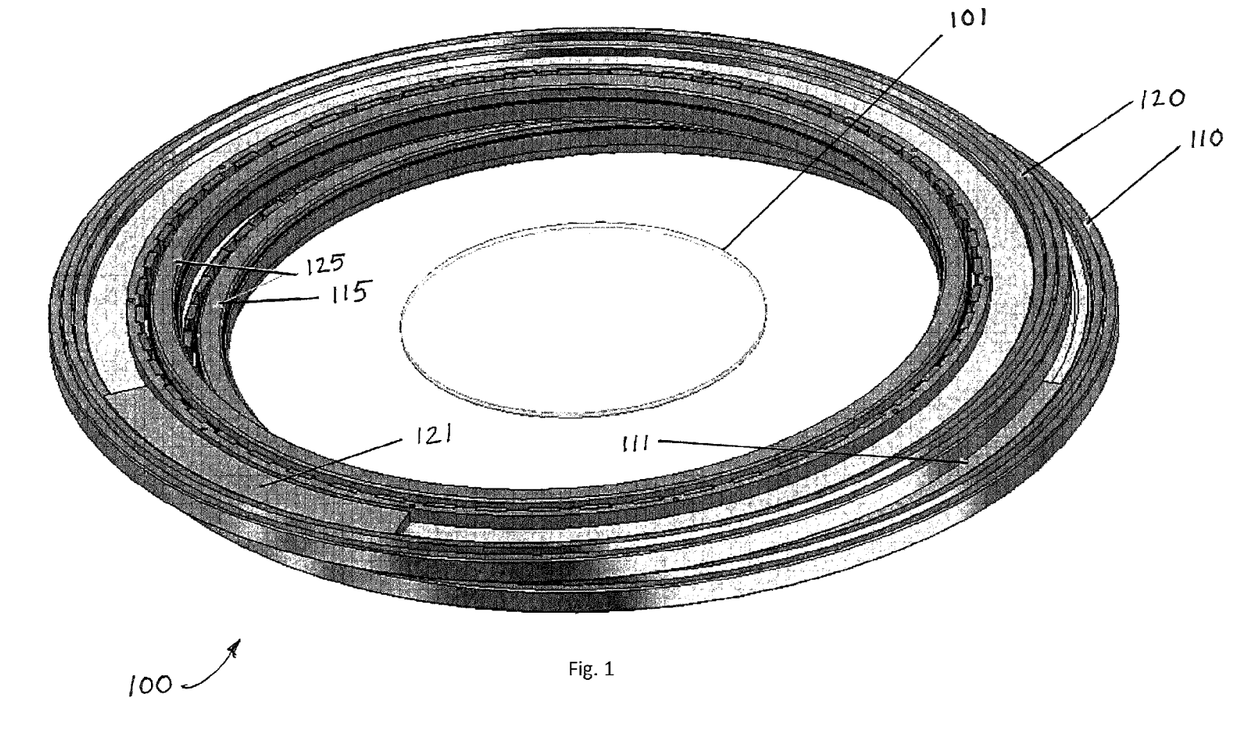
FIGS. 1 and 2 are perspective side views of a hub-based AVC system having two imbalanced rotors with offset axes of rotation according to embodiments of the present subject matter.
Figure 2:
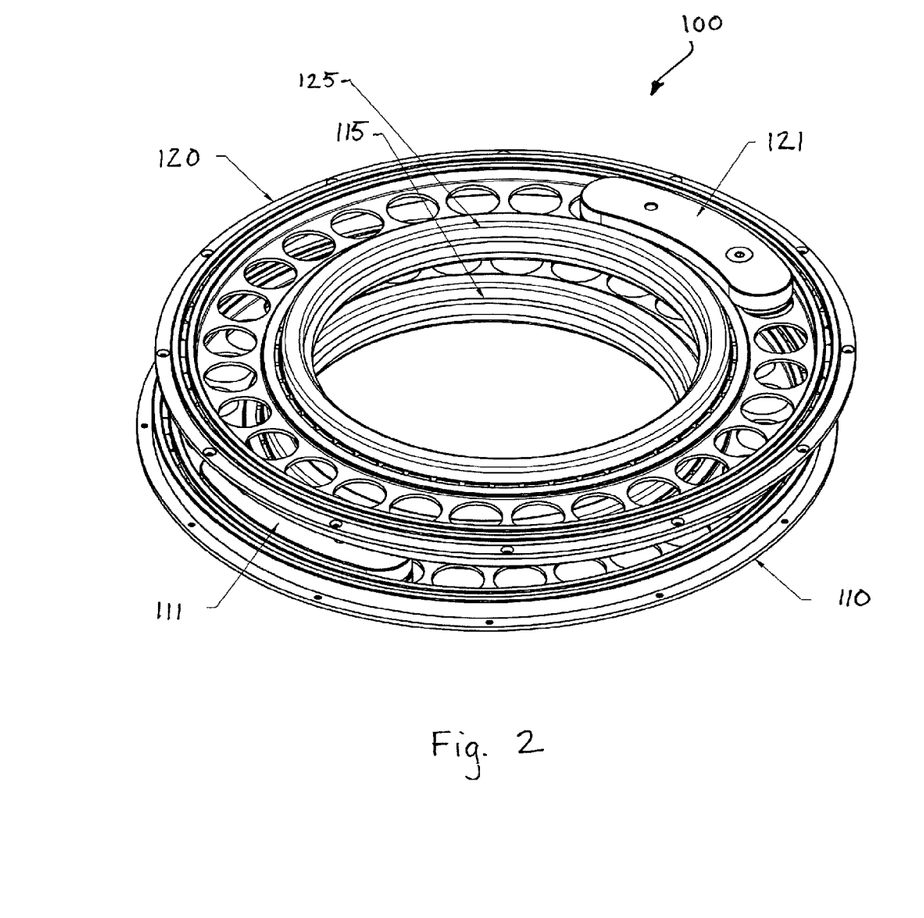
Figure 3:
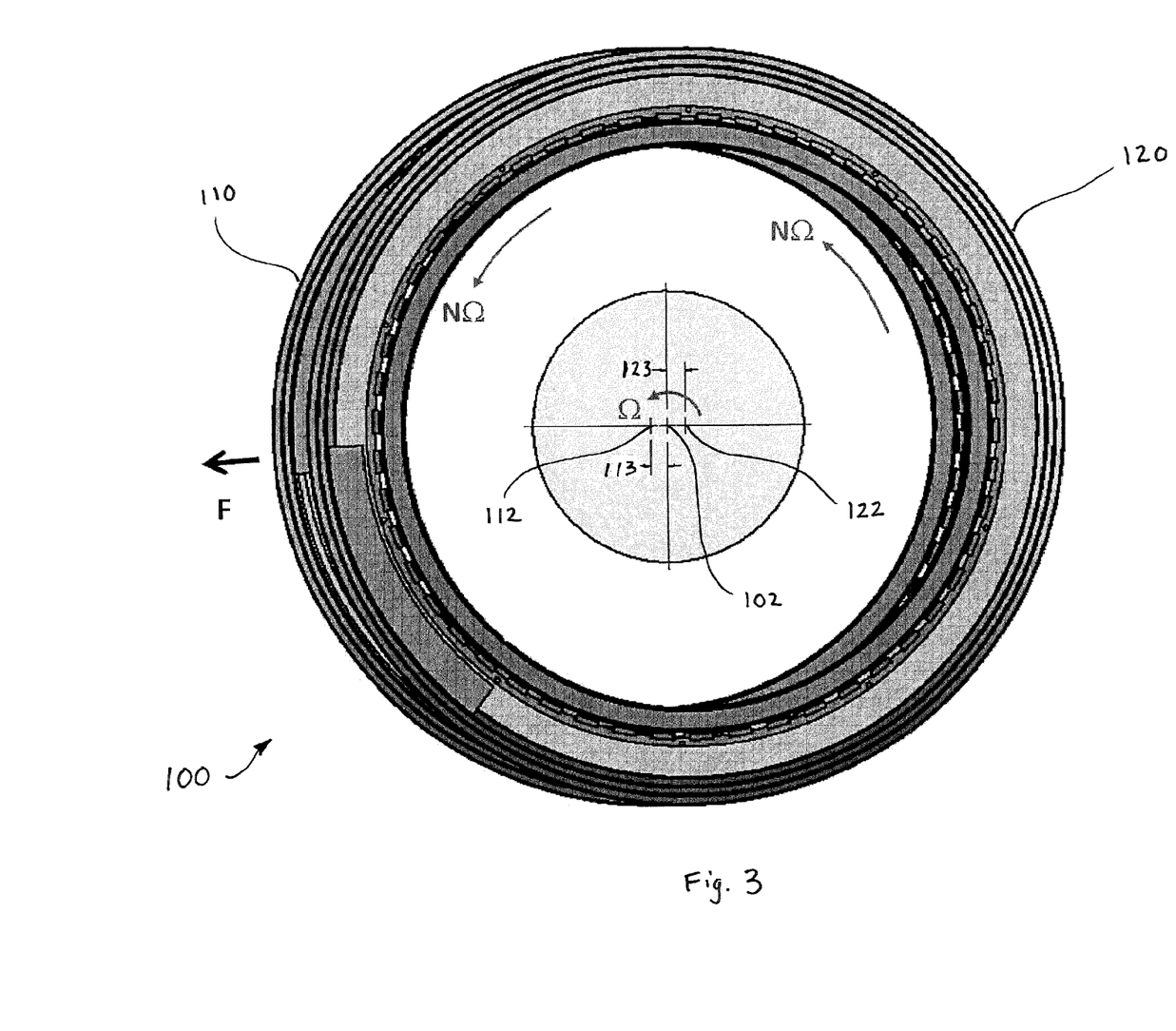
FIGS. 3 and 4 are top views of a hub-based AVC system having two imbalanced rotors with offset axes of rotation operating in a normal mode according to an embodiment of the present subject matter.
Figure 4:
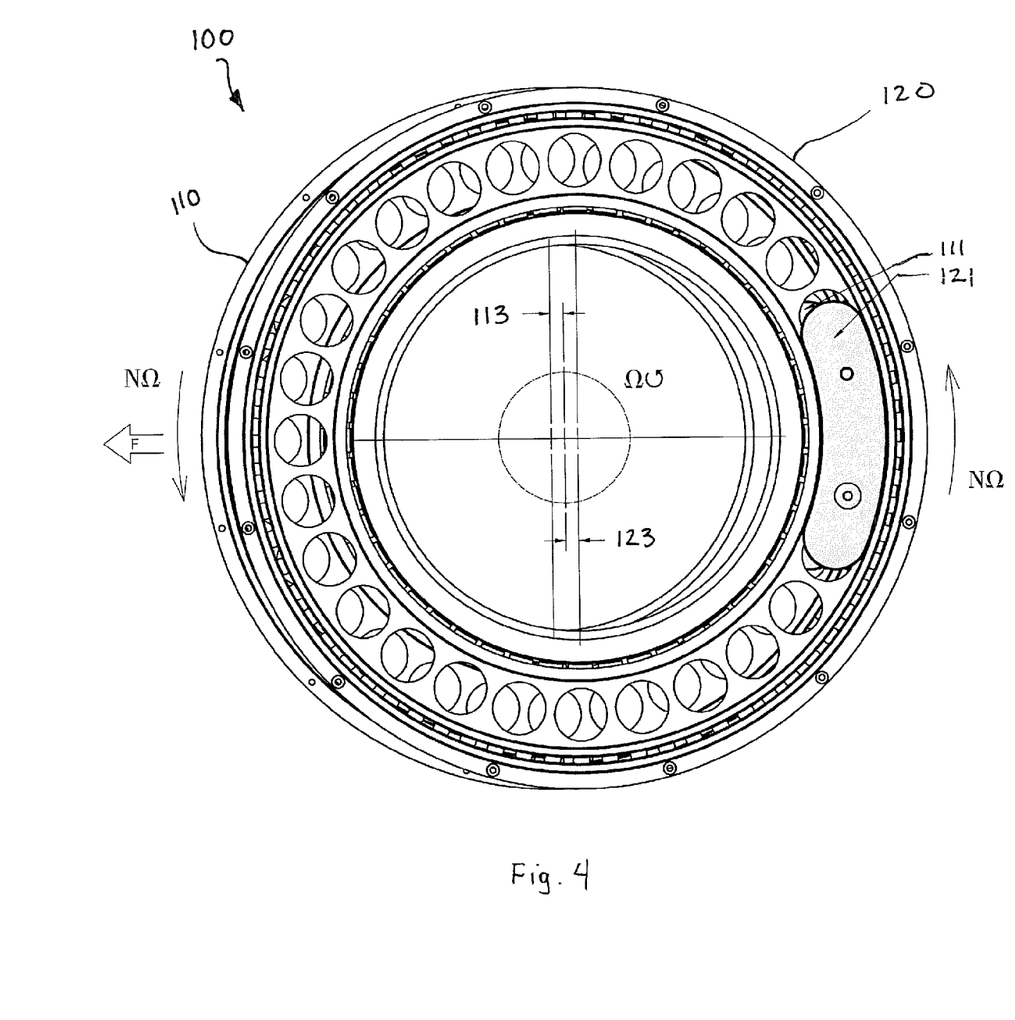

As illustrated in FIG. 1, the hub 101 is represented as a disk in the center of the system 100 to illustrate that such an assembly is substantially toroidal (i.e., donut shaped) and can enable other helicopter systems, such as the slip ring and device system, to pass thought its inner diameter.

Figure 5:
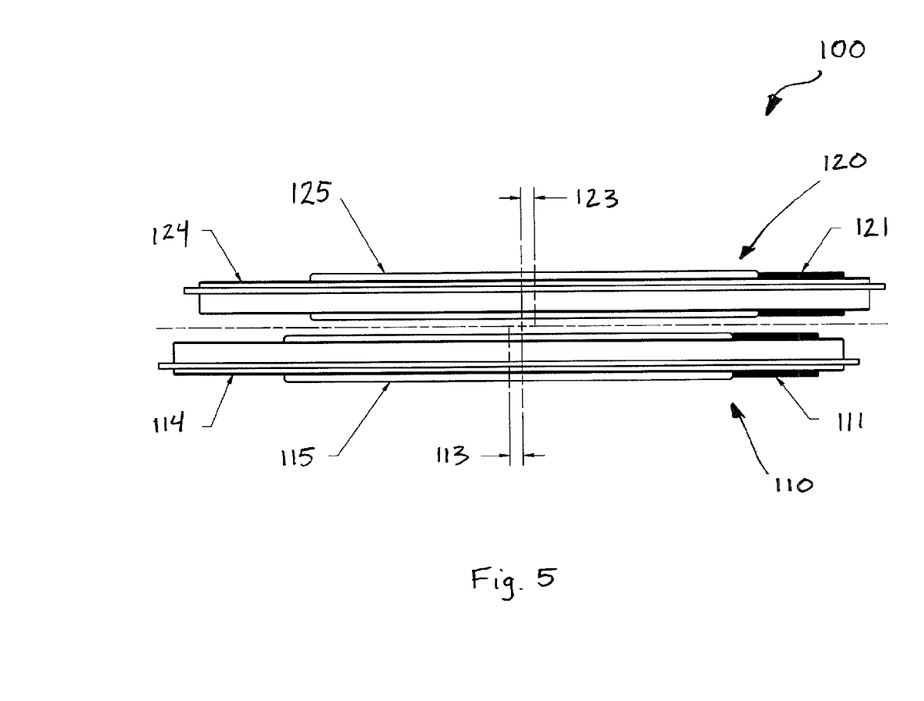
FIG. 5 is a side view of a hub-based AVC system showing two imbalanced rotors with offset axes of rotation operating in a normal mode according to an embodiment of the present subject matter.
Figure 6:
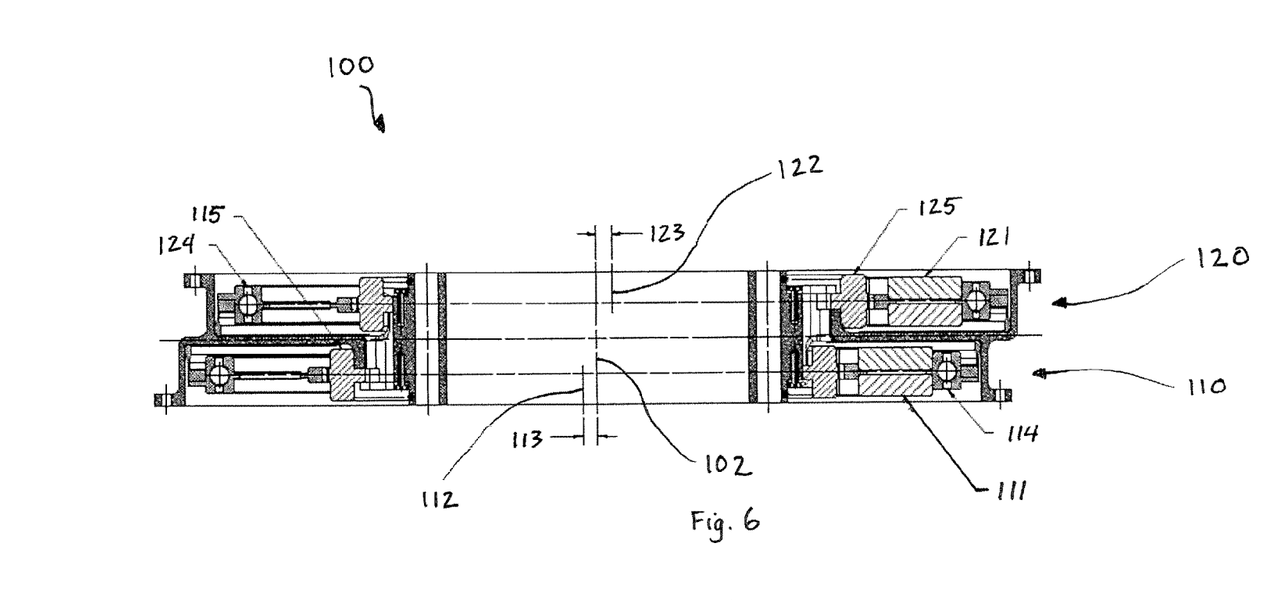
FIG. 6 is a side cutaway view of a hub-based AVC system showing two imbalanced rotors with offset axes of rotation operating in a normal mode according to an embodiment of the present subject matter.

The system 100 includes at least one pair of imbalanced rotors coupled with the rotating hub 101. Referring to the configuration shown in FIGS. 1-6, for example, the system 100 includes two motorized imbalanced rotors with offset centers of rotation. A first rotor 110 includes a first mass 111 that is rotatable about a first axis of rotation 112 that is offset a first distance 113 in a first direction from the hub axis of rotation 102. A non-limiting example of the first distance 113 is about 0.5 inches (about 1.27 centimeters). The first rotor 110 further includes a first rotor bearing 114 and a first rotor stator 115. In addition, a second rotor 120 includes a second mass 121, a second rotor bearing 124, and a second rotor stator 125. The second mass 121 is rotatable about a second axis of rotation 122 that is offset a second distance 123 from the hub axis of rotation 102, but in a second direction that is different from the first direction. A non-limiting example of the second distance 123 is about 0.5 inches (about 1.27 centimeters). As shown in FIGS. 3-6, in some embodiments, the second direction in which the second axis of rotation 122 is offset from the hub axis of rotation 102 is substantially opposite from the first direction in which the first axis of rotation 112 is offset from the hub axis of rotation 102. As shown, both the first direction and the second direction extend along a common line that is perpendicular to the hub axis of rotation 102, albeit in opposite directions. In addition, as shown in FIGS. 5 and 6, in some embodiments, all of the hub axis of rotation 102, the first axis or rotation 112, and the second axis of rotation 122 are substantially parallel with one another.

Regardless of the particular configuration, the at least one pair of imbalanced rotors is configured for co-rotation at a rotor speed that is controllable to be a multiple of the hub frequency, and a phase associated with each imbalanced rotor is adjustable to create a controllable rotating force vector. In particular, in some embodiments, normal operation of the system 100 can involve the hub 101 spinning at frequency $\Omega$, and the at least one pair of imbalanced rotors being driven to co-rotate at a rotor speed $N\Omega$ (with respect to the stationary frame), where N is a multiple of the hub frequency. FIGS. 3-6 illustrate the first mass 111 and the second mass 121 to be nearly aligned, thus creating a rotating force vector of a nearly maximum amplitude and at frequency $N\Omega$. If each imbalanced rotor has an imbalance of mr, then the amplitude of the output force is between 0 and $2\ mr\ (N\Omega)^2$. The magnitude and phase of this rotating force vector are controlled in order to minimize hub loads at $N\Omega$.

Figure 8:
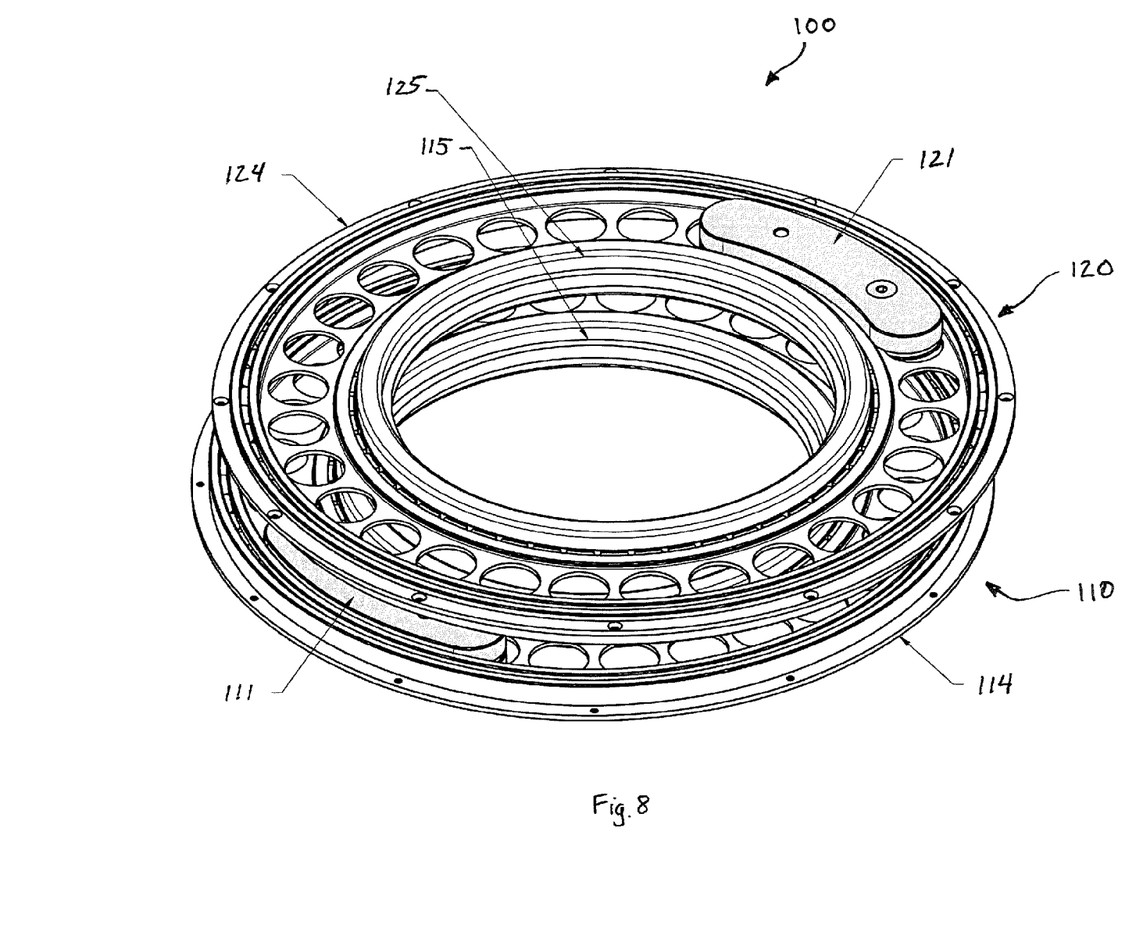
FIG. 8 a perspective side view of a hub-based AVC system having two imbalanced rotors with offset axes of rotation after a loss of operation failure according to an embodiment of the present subject matter.
Figure 9:
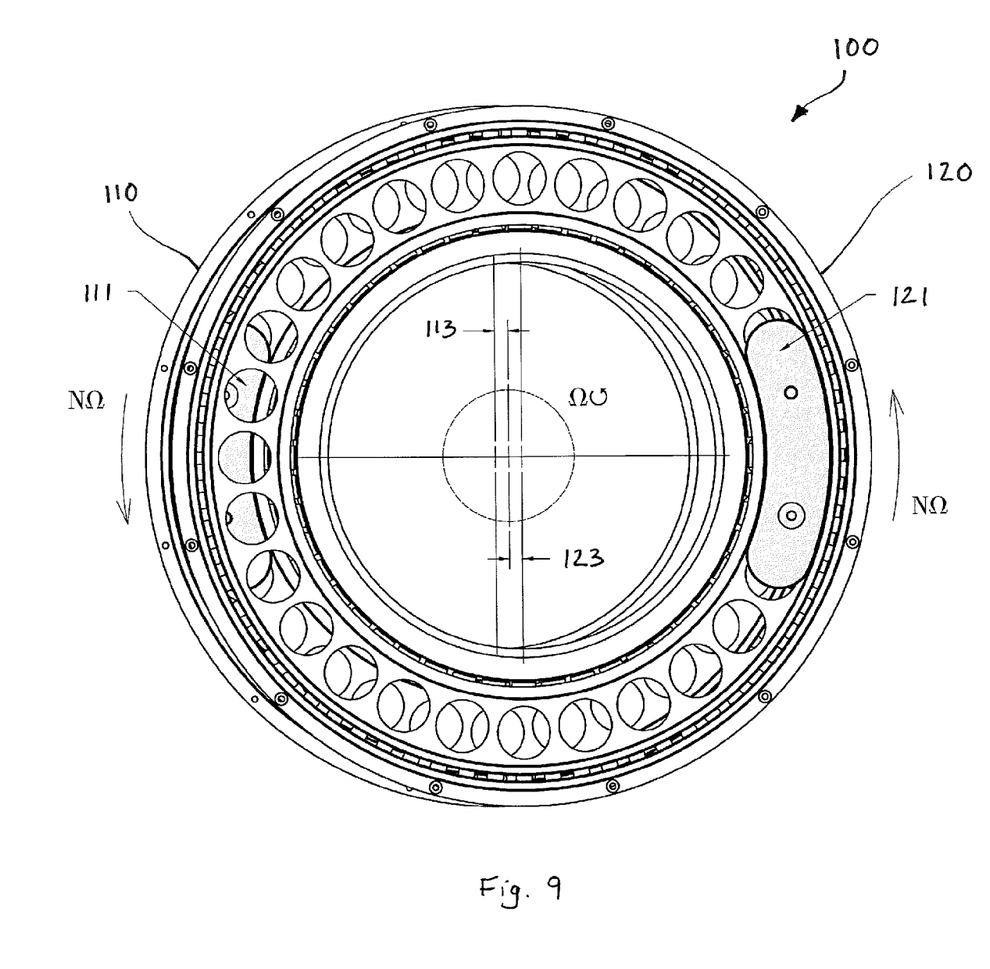
FIG. 9 is a top view of hub-based AVC system having two imbalanced rotors with offset axes of rotation after a loss of operation failure according to an embodiment of the present subject matter.
Figure 10:
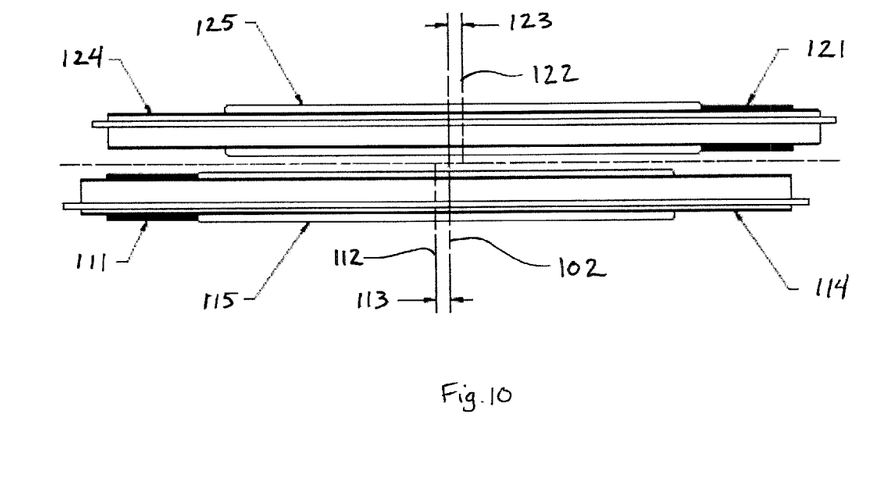
FIG. 10 is a side view of a hub-based AVC system having two imbalanced rotors with offset axes of rotation after a loss of operation failure according to an embodiment of the present subject matter.

In some embodiments, the system 100 is further configured such that, during a loss of operation or loss of power failure mode, the at least one pair of imbalanced rotors is configured to rotate to an orientation of low static imbalance with respect to one another. FIGS. 8-10 illustrate the two motorized imbalanced rotors as configured to spin nominally with the hub at speed $\Omega$ during a loss of operation or loss of power. In this condition, the imbalanced rotors can create forces at frequency $\Omega$ due to static imbalance at levels between 0 and $2\ mr\ \Omega^2$ depending on the relative orientation of the masses. Because of the offset axes of rotation of the imbalanced rotors, centrifugal forces will tend to orient the imbalances substantially at 180 degrees apart such that static imbalance forces will be near zero.

Figure 7:
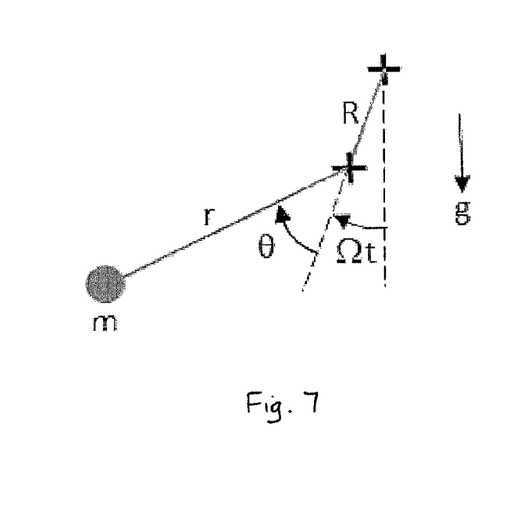
FIG. 7 is a schematic of a single imbalanced rotor.

To model this force, FIG. 7 shows a single imbalanced rotor with an offset center of rotation where g is the gravitational force, $\Omega$ is the hub rotational velocity [Rad/s], R is the offset of the rotor from the hub center of rotation, mr is the imbalance of the rotor. The equation of motion for this system is as follows:

$$\ddot{\theta} + 2\zeta\omega_n \dot{\theta} + \omega_n^2 \sin\theta = \alpha \sin(\Omega t + \theta)$$

where $$\left(\frac{\omega_n}{\Omega}\right)^2 = mr\ R/J \text{ and } \alpha = mr\ g/J$$

where J is the rotor inertia. The natural frequency of the pendulum mass in the centrifugal field is $\omega_n$. The radius r, in a general sense, is an effective radius defining the location of the center of mass of the imbalanced rotor. In this case, rotor inertia is $J=mr^2$ and the motion of the system can be characterized by the following parameters:

$$\frac{\omega_n}{\Omega} = \sqrt{R/r} \text{ and } \alpha = g/r$$

Whereas α is only a factor when gravity is present, the non-dimensional ratio $\omega_n/\Omega$ affects many design considerations. In particular this affects (a) the speed at which the imbalanced rotors will achieve a balanced condition upon loss of motor operation, (b) the amplitude of 1 P rotor wobble due to gravity after loss of operation, (c) the additional motor power resulting from rotor offset, and (d) the parasitic moment during normal operation resulting from rotor offset.

The dimensionless ratio $\omega_n/\Omega$ will dictate the speed at which the offset imbalanced masses become statically balanced upon loss of operation. The number of hub rotations M it will take for the system to settle out to the static balance condition is proportional to the following:

$$M = \Omega \tau_{settle} \sim \frac{1}{2\zeta\left(\frac{\omega_n}{\Omega}\right)}$$

where ζ is the torsional damping ratio of the system.

When gravity is present, the right hand side term involving α imposes an oscillatory torque on the imbalanced rotor. The rotor responds with an oscillation at frequency Ω and steady state magnitude Θ:

$$|\Theta| \cong \frac{\alpha}{\Omega^2 \sqrt{\left[\left(\frac{\omega_n}{\Omega}\right)^2 - 1\right]^2 + 4\zeta^2\left(\frac{\omega_n}{\Omega}\right)^2}}$$

Because the dynamics of the system are inherently nonlinear when the gravitational disturbance is applied, the analytical expression for the steady-state magnitude of the disturbance oscillation is only an approximation.

In view of these considerations, in some embodiments, it can be advantageous for the offset distances R for each imbalanced rotor to be sized such that a ratio of the offset distance R to the radius r has a value that is within a range that provides desired performance. For example, the ratio of R/r can be less than a upper limit at which an expected centripetal field (e.g., about 4 g) would yield uncontrollable imbalances and/or very steep power increases. Additionally, the ratio of R/r can be selected to be greater than a lower limit below which the settling time $\Omega\tau_{settle}$ is undesirably large (e.g., number of hub rotations M is greater than about 4). For example, in some embodiments, the system 100 may provide desirable functionality with values of R/r between 0.02 and 0.2.

During typical operation of the system (e.g., while motors are running), there is additional power required due to the offset radius of the rotors. Per rotor, there is an additional sinusoidal power required $P_R$ due to the offset R which occurs at frequency (N−1)Ω at an amplitude:

$$P_R = (N-1)\left(\frac{\omega_n}{\Omega}\right)^2 J\Omega^3$$

where N−1 is the multiple of Ω at which the imbalanced rotor is spinning in the rotating frame.

A parasitic torque during normal operation will result from the rotor offset. The maximum parasitic torque $\tau_{max}$ occurs when the imbalanced rotors are spinning at NΩ and are neutralized.

$$\tau_{max} = J\left(\frac{\omega_n}{\Omega}\right)^2 (N\Omega)^2$$

The requirement of this additional sinusoidal power $P_R$ and the presence of this parasitic torque is tolerated, however, because the offsets of the imbalance rotors allow the system 100 to better address potentially hazardous and catastrophic failure modes as discussed above.

Figure 11:
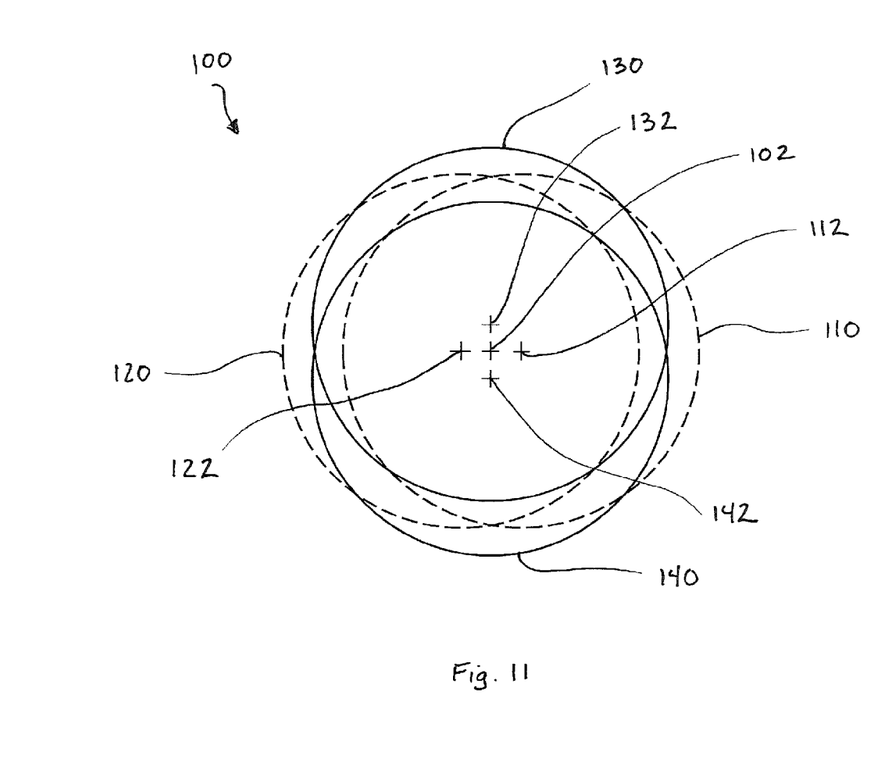
FIG. 11 is a top schematic view of a hub-based AVC system having two pairs of imbalanced rotors with offset axes of rotation according to an embodiment of the present subject matter.

In other embodiments, additional imbalanced rotor pairs are added. In the non-limiting embodiment shown in FIG. 11, a second pair of imbalanced rotors are coupled with the rotating hub 101 In the embodiment shown in FIG. 11, the second pair of imbalanced rotors has a third imbalanced rotor 130 that is rotatable about a third axis of rotation 132, which is offset in a third direction from the hub axis of rotation 102. The second pair of imbalanced rotors further includes a fourth imbalanced rotor 140 that is rotatable about a fourth axis of rotation 142, which is offset from the hub axis of rotation 102 in a different direction (e.g., opposite) of the third axis of rotation 132. As illustrated in FIG. 11, third direction and fourth direction are substantially perpendicular both to the first direction (i.e., the direction to which the first rotor 110 is offset) and the second direction (i.e., the direction to which the second rotor 120 is offset) and to the hub axis of rotation 102. Those having skill in the art will recognize, however, that other orientations and configurations can be used to achieve the static force balancing during a loss of operation or loss of power failure mode.

Other embodiments of the present invention will be apparent to one skilled in the art. As such, the foregoing description merely enables and describes the general uses and methods of the present invention. Accordingly, the follow claims define the true scope of the present invention.

What is claimed is:
1. A hub-based AVC system comprising:
   a hub associated with a rotary wing aircraft, the hub configured for rotation about a hub axis of rotation at a hub frequency;
   at least one controller;
   at least one sensor in electronic communication with the at least one controller, the at least one sensor configured to measure at least one vibration associated with the rotary wing aircraft;
   at least one pair of imbalanced rotors coupled about the hub, the at least one pair of imbalanced rotors comprising:
      a first imbalanced rotor having a first axis of rotation that is offset in a first direction from the hub axis of rotation; and
      a second imbalanced rotor having a second axis of rotation that is offset from the hub axis of rotation in a second direction that is different from the first direction; and
   wherein the at least one controller is configured to provide control to at least one of the imbalanced rotors;
   wherein the at least one pair of imbalanced rotors is configured for co-rotation at a controllable rotor speed, and wherein a phase associated with each imbalanced rotor is adjustable to create a controllable rotating force vector.

2. The hub-based AVC system of claim 1, wherein during a loss of operation or loss of power failure mode, the at least one pair of imbalanced rotors is configured to rotate to an orientation of low static imbalance with respect to one another.

3. The hub-based AVC system of claim 1, wherein the at least one controller is configured to adjust a magnitude of the controllable rotating force vector.

4. The hub-based AVC system of claim 1, wherein each imbalanced rotor has at least one controller providing control thereto.

5. The hub-based AVC system of claim 1, wherein each pair of imbalanced rotors has at least one controller providing control thereto.

6. The hub-based AVC system of claim 1, wherein the first axis of rotation is offset from the hub axis a first distance and the second axis of rotation is offset from the hub axis a second distance; and wherein the first distance and the second distance are substantially the same.

7. The hub-based AVC system of claim 6, wherein a magnitude of each of the first distance and the second distance is sized such that a ratio of the magnitude to an effective radius of a center of mass of either of the first imbalanced rotor or the second imbalanced rotor has a value between 0.02 and 0.2.

8. The hub-based AVC system of claim 1, wherein the second direction in which the second axis of rotation is offset from the hub axis of rotation is substantially opposite from the first direction in which the first axis of rotation is offset from the hub axis of rotation.

9. The hub-based AVC system of claim 1, wherein the at least one pair of imbalanced rotors comprises a second pair of imbalanced rotors coupled with the rotating hub, the second pair of imbalanced rotors comprising:
   a third imbalanced rotor having a third axis of rotation that is offset in a third direction from the hub axis of rotation; and
   a fourth imbalanced rotor having a fourth axis of rotation that is offset from the hub axis of rotation in a fourth direction that is different from the third direction.

10. The hub-based AVC system of claim 9, wherein the fourth direction in which the fourth axis of rotation is offset from the hub axis of rotation is substantially opposite from the third direction in which the third axis of rotation is offset from the hub axis of rotation.

11. A method for active vibration control at a rotating hub of a rotary wing aircraft, the hub being configured for rotation about a hub axis of rotation at a hub frequency, the method comprising:
   providing at least one controller and at least one sensor capable of measuring a vibration in the rotary wing aircraft, wherein the at least one sensor is in electronic communication with the at least one controller;
   providing at least one pair of imbalanced rotors coupled about the hub, the at least one controller controlling the at least one of imbalanced rotors, wherein one of the pair of imbalanced rotors is a first imbalanced rotor having a first axis of rotation that is offset in a first direction from the hub axis of rotation, and the second one of the pair of imbalanced rotors is a second imbalanced rotor having a second axis of rotation that is offset from the hub axis of rotation in a second direction that is different from the first direction;
   during normal operation, co-rotating at least one pair of imbalanced rotors that are coupled with the hub at a controllable rotor speed, wherein a phase associated with each imbalanced rotor is adjustable to create a controllable rotating force vector; and
   during a loss of operation or loss of power failure mode, rotating the at least one pair of imbalanced rotors to an orientation of low static imbalance with respect to one another.

12. The method of claim 11, wherein co-rotating the at least one pair of imbalanced rotors at a controllable rotor speed comprises co-rotating the at least one pair of imbalanced rotors at a speed that is controllable to be a multiple of the hub frequency.

13. The method of claim 11, wherein the first axis of rotation is offset from the hub axis a first distance and the second axis of rotation is offset from the hub axis a second distance; wherein the first distance and the second distance are substantially the same.

14. The method of claim 11, wherein the second direction in which the second axis of rotation is offset from the hub axis of rotation is substantially opposite from the first direction in which the first axis of rotation is offset from the hub axis of rotation.

15. The method of claim 11, wherein co-rotating the at least one pair of imbalanced rotors that are coupled with the rotating hub comprises co-rotating a second pair of imbalanced rotors that are coupled with the rotating hub.

16. The method of claim 15, wherein the second pair of imbalanced rotors comprises:
   a third imbalanced rotor having a third axis of rotation that is offset in a third direction from the hub axis of rotation; and
   a fourth imbalanced rotor having a fourth axis of rotation that is offset from the hub axis of rotation in a fourth direction that is different from the third direction.

17. The method of claim 16, wherein the fourth direction in which the fourth axis of rotation is offset from the hub axis of rotation is substantially opposite from the third direction in which the third axis of rotation is offset from the hub axis of rotation.

* * * * *